Aug. 14, 1934.   C. A. PIERCY   1,970,393
METHOD OF AND MEANS FOR CONNECTING RESERVOIRS TO FLUID FILLED CABLES
Original Filed Nov. 22, 1929
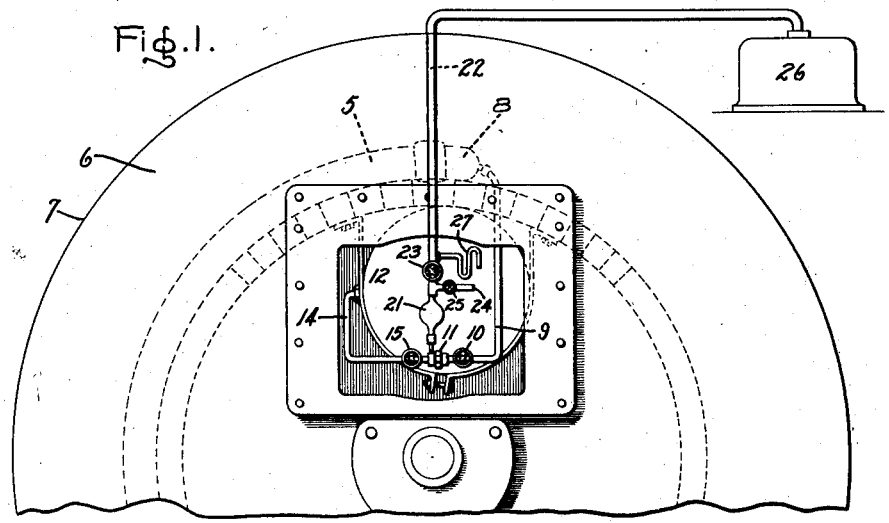
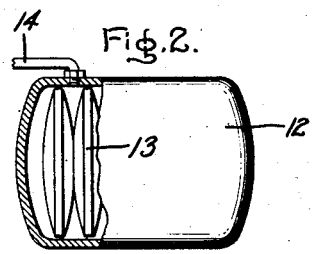
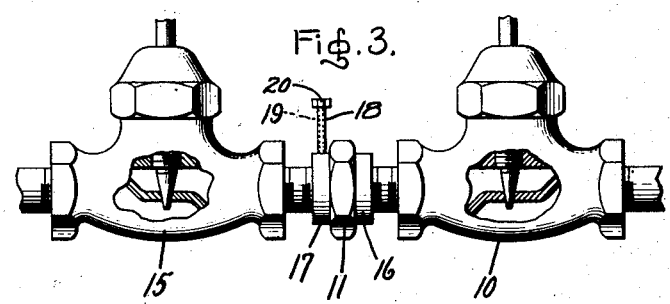
Inventor:
Carl A. Piercy.
by Charles V. Mullan
His Attorney.

Patented Aug. 14, 1934

1,970,393

UNITED STATES PATENT OFFICE 1,970,393

METHOD OF AND MEANS FOR CONNECTING RESERVOIRS TO FLUID FILLED CABLES

Carl A. Piercy, Ballston Lake, N. Y., assignor to General Electric Company, a corporation of New York Application November 22, 1929, Serial No. 409,116
Renewed January 16, 1934

7 Claims. (Cl. 173—264)

It is now generally understood that the presence of air or other gases in a high tension electric cable is objectionable, but it is not so well understood or appreciated how fully and completely these gases must be removed to ensure the proper operation of the cable when in service.

In the manufacture, the cable is first carefully evacuated and then filled with degasified oil, after which the ends of the cable are carefully sealed to prevent the escape of oil or the admission of air or other gases. After a length or section of the cable has been so treated and sealed it is necessary to connect a temporary reservoir thereto to compensate for the expansion and contraction of the oil due to temperature changes. The problem presented is how to connect the reservoir to the cable length, both having been evacuated and filled with degasified oil, without permitting air or other gases to enter while the connection is being made. The temporary reservoirs are connected at the factory and later other reservoirs are connected to the cable in the field or place of installation where the conditions render the work much more difficult. Whenever a cable length having a temporary reservoir is delivered to the place of installation and drawn into a conduit duct the reservoir is removed and some or all of the lengths provided with other reservoirs of the same or generally similar character.

My invention has for its object the provision of a simple reliable means and method of procedure for use both in the factory and in the field, whereby reservoirs may be connected to cable lengths or sections in such manner as to preclude the admission of air or other gases to the cable and also to the reservoir during the jointing operation.

For a consideration of what I believe to be novel and my invention, attention is directed to the accompanying description and the claims appended thereto.

In the drawing which is illustrative of my invention, Fig. 1 is a view in end elevation of a cable reel and reservoir with means for connecting the cable and reservoir; Fig. 2 is a diagrammatic view of a reservoir and Fig. 3 is a view partly in section of a special union and the shut-off valves associated therewith.

5 indicates one end of a length of high tension cable of any ordinary or suitable construction which is sealed at its ends and filled with degasified fluid such as oil under a pressure which to obtain the best operating results should not be less than that of the atmosphere. The cable is shown as mounted on a shipping reel 6 of suitable construction having the usual barrel around which the cable is wound and enlarged end flanges 7 which are of sufficient diameter to protect the cable from injury as the reel is rolled about. To one of the ends of the cable is secured as by a wiped joint a cap 8 of suitable construction which seals the end thereof and which contains degasified oil or other fluid at the same pressure as that in the cable, usually at a pressure slightly above atmosphere. To this cap is secured a conduit 9 which also contains oil up to the shut-off valve 10. On the conduit beyond the valve is screwed one-half of a union 11 as best shown in Fig. 3. The term "union" as employed herein is intended to comprehend all suitable forms of connecting means or devices for uniting the conduits which in turn are connected to the cable and reservoir without regard to the specific form of the device itself.

12 indicates a variable capacity reservoir which contains means such as hermetically sealed cellular elements 13 which are capable of contracting when the oil in the cable expands and of expanding when the oil contracts. The space or chamber within the reservoir not occupied by the cells is filled with degasified oil under a pressure slightly above atmosphere. To the casing of the reservoir is connected a conduit 14 which is filled with the same oil up to the shut-off valve 15. On the end of the conduit is connected the other half of the union 11. The valves are preferably as close to the union as can be conveniently done to reduce the air column in the conduit between them. Assuming the parts of the union to be properly connected and the valves 10 and 15 closed, there will be a small column of air in the conduits and in union between the valves which must be removed. There will also be some air in the attached parts which are to be referred to later. Although the contained air is limited to a few cubic inches it nevertheless would have a detrimental effect on the cable when in operation if permitted to remain in the system. The fact that such a small amount of air in a cable could have any effect injurious or otherwise is surprising, but it is true.

As stated above, it is necessary to remove whatever air is contained in the conduits 9 and 14 and union 11 before the reservoir can be connected to the cable, and it is also important to fill the section of conduit between the valves 10 and 15 with degasified oil prior to establishing a through connection. Since some sort of a union has to be used to unite the conduits 9 and 14, I find it desirable to so modify the union that the necessary vacuum pump may be connected thereto. This is shown in Fig. 3 wherein 16 and 17 indicate parts of the union which are united by screw threads as usual, the interior meeting faces being ground. One of the parts is bored and tapped to receive a stem 18 which is screw threaded at its ends and has a central passage 19 communicating with the interior of the union, said stem when in use standing in a vertical position. The outer end of the stem is arranged to receive a cap 20 for permanently closing or sealing the same. The stem is also arranged to be connected to a sight-glass bulb 21 by means of a rubber hose or other means. To the upper end of bulb is connected a pipe 22, which for the purposes of distinction and to avoid confusion will be referred to as a manifold. Any suitable means for connecting the bulb and manifold, such as rubber tubing, may be used. In the manifold is a shut-off valve 23, and between it and the bulb is an air vent 24 which contains a shut-off valve 25. To the other end of the manifold is connected a vacuum pump as indicated at 26. There is also provided a vacuum gauge 27 of any suitable character, that shown being of the absolute gauge U-tube variety containing a body of fluid, such as mercury.

The method of connecting a cable end to the reservoir is as follows, it being understood that both have previously been filled with degasified oil up to the valves 10 and 15 in their respective connected conduits. The parts of the union are then properly united, cap 20 removed and the bulb 21 and manifold 22 mounted in place together with their associated parts. The air within the conduits between the shut-off valves and that within the bulb and manifold is then removed by the operation of the vacuum pump 26, it being understood that the valve 25 in the air vent is closed. After the gauge 27 shows that a proper vacuum has been established the valve 15 is very slightly opened to allow oil from the reservoir to flow through the stem into the bulb 21. Under these conditions if there is no air leak in the conduits and union the oil level will steadily rise. On the other hand if there is leakage, air bubbles will be formed and as such will pass upward through the oil in the bulb. If there are indications of air it is necessary to tighten the various connections to stop the leak. The valve 23 is then closed and valve 25 in the air vent is then opened to break the vacuum in the bulb and parts beyond, after which the bulb and manifold are removed. Under these conditions the ends of the conduits, the union and the stem will be filled to overflowing, and while the oil is flowing from the stem cap 20 containing a gasket is applied thereto. After this the shut-off valves 10 and 15 are fully opened to establish a through connection between the cable and the reservoir.

The above method of procedure is followed each time a temporary reservoir is connected to a cable length or section, whether it be in the factory or in the field, and by reason thereof the admission of air or other gases to the various parts is effectively prevented. I may also employ the same arrangements of parts and method of procedure for connecting permanent reservoirs to the cable if desired.

The means for supporting the reservoir inside of the reel are not claimed herein as they form the subject matter of my divisional application Serial No. 707,310, filed January 19, 1934.

What I claim as new and desire to secure by Letters Patent of the United States, is:

1. A cable having an impervious sheath sealed at one end, an enclosure for the other end, a reservoir, bodies of liquid insulation under pressure in the cable and reservoir from both of which air is excluded, conduits respectively connected to the enclosure and the reservoir, a shut-off valve in each conduit, a hollow connector uniting the valve bodies, a vacuum pump for evacuating the connector and the parts of the valve bodies adjacent the connector when the valves are closed, and means for sealing the connector after it has been filled with liquid and the vacuum pump disconnected.

2. A cable and a reservoir both filled with liquid under pressure from which air is excluded combination with short conduits connected respectively to an end of the cable and to the reservoir, a shut-off valve in each conduit near the outer end thereof, a divided connector uniting the valve bodies, a union in the connector between the valves, a vacuum pump for evacuating the connector while the valves are closed, and means for sealing the connector against the escape of liquid or the admission of air after they have been filled with liquid and the pumps disconnected.

3. A cable and a reservoir both filled with liquid under pressure from which air is excluded in combination with short conduits connected respectively to an end of the cable and to the reservoir, a shut-off valve in each conduit near the outer end thereof, a divided connector uniting the ends of the conduits and located between the valves, a union in the connector, a manifold connected to the connector, a vacuum pump connected to the manifold for evacuating the parts between the valves, a valve for shutting off the vacuum pump, and a means for sealing the conduits and pipe after they have been filled with liquid and while it is flowing from the reservoir and after the manifold has been disconnected.

4. A cable and a reservoir both filled with liquid under pressure from which air is excluded in combination with short conduits connected respectively to an end of the cable and to the reservoir, a shut-off valve in each conduit near the outer end thereof, a pipe connecting the valve bodies, a union in the pipe, a stem mounted in the union through which access is had to the parts between the shut-off valve, a manifold connected to the stem, a vacuum pump connected to the manifold, a shut-off valve in the manifold, and a means for sealing the stem after the conduits and connecting pipes have been evacuated and filled with liquid.

5. A cable and a reservoir both filled with liquid under pressure from which air is excluded in combination with short conduits connected respectively to an end of the cable and to the reservoir, a shut-off valve in each conduit near the outer end thereof, a hollow connector uniting the valve bodies, a stem through which access is had to the parts between the shut-off valves, a sight glass bulb connected to the stem, a vacuum pump connected to the bulb for evacuating the conduits and the connecting parts, a controllable air vent in the connection between the pump and bulb, and a cap for sealing the stem after the conduits and connected parts have been evacuated and filled with liquid from the reservoir and the bulb removed.

6. The method of connecting two containers, each having a short conduit and a shut-off valve, and containing degasified liquid, which comprises connecting the valve bodies by a hollow connector having a stem, evacuating the connector and adjacent ends of the valve bodies through the stem by a vacuum pump, opening one of the valves to permit liquid to fill the connector and stem to overflowing, disconnecting the pump, sealing the stem while liquid is flowing therefrom and finally opening both of the valves to establish a through connection between the containers.

7. A cable and a reservoir both filled with degasified fluid, a movable support common to the cable and reservoir, a cap secured to one end of the cable and also containing said fluid, a conduit connected to the cap, a shut-off valve in the conduit near the outer end thereof, a conduit connected to the reservoir and terminating adjacent an end of the conduit connected to the cap, a shut-off valve near the outer end of the reservoir conduit, a union connecting the adjacent ends of the conduits and located between the valves, a hollow stem entering the union through which air from within the union is extracted and through which fluid from the reservoir flows when its controlling valve is opened, a vacuum pump temporarily connected to the stem for evacuating the union, and a means for permanently sealing the union after it is filled with fluid from the reservoir.

CARL A. PIERCY.